(12) United States Patent
Chu et al.

(10) Patent No.: US 7,121,133 B2
(45) Date of Patent: Oct. 17, 2006

(54) SYSTEM, METHOD, AND APPARATUS FOR GLIDE HEAD CALIBRATION WITH ENHANCED PZT CHANNEL FOR VERY LOW QUALIFICATION GLIDE HEIGHTS

(75) Inventors: Norman Chu, San Francisco, CA (US); Shanlin Duan, Fremont, CA (US); Patricia Galindo, Morgan Hill, CA (US); Hang Fai Ngo, San Jose, CA (US); Yu Lo, Foster City, CA (US); Nalin Zhou, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 189 days.

(21) Appl. No.: 10/857,195

(22) Filed: May 28, 2004

(65) Prior Publication Data

US 2005/0262922 A1    Dec. 1, 2005

(51) Int. Cl.
*G01B 7/34* (2006.01)
(52) U.S. Cl. ...................................... 73/1.89
(58) Field of Classification Search ............... 73/1.89; 356/243.3, FOR. 106
See application file for complete search history.

(56) References Cited

U.S. PATENT DOCUMENTS

| | | | |
|---|---|---|---|
| 5,792,947 A | 8/1998 | Pogrebinsky et al. |
| 5,952,563 A | 9/1999 | Shiraki |
| 6,021,666 A | 2/2000 | Yao et al. |
| 6,026,676 A | 2/2000 | Chen et al. |
| 6,073,486 A | 6/2000 | Packard et al. |
| 6,092,412 A | 7/2000 | Flechsig et al. |
| 6,267,004 B1 | 7/2001 | Ku et al. |
| 6,366,416 B1 | 4/2002 | Meyer et al. |
| 6,568,252 B1 | 5/2003 | Boutaghou |
| 6,662,623 B1 | 12/2003 | Baumgartner et al. |
| 6,771,453 B1* | 8/2004 | Baumgartner et al. ........ 360/75 |
| 2003/0026015 A1 | 2/2003 | Yokohata et al. |
| 2003/0086197 A1 | 5/2003 | Baumgartner et al. |
| 2003/0193734 A1 | 10/2003 | Seing et al. |

FOREIGN PATENT DOCUMENTS

| | | |
|---|---|---|
| JP | 1140009 | 6/1989 |
| JP | 4058103 | 2/1992 |
| JP | 6011333 | 1/1994 |
| JP | 8045216 | 2/1996 |
| JP | 8114431 | 5/1996 |

OTHER PUBLICATIONS

"Contact Glide Test", IBM Technical Disclosure Bulletin, Jul. 1995, 95A 61313//SA8920064, vol. 38, Pub. No. 7, pp. 57-58.
"Advanced Piezoelectric Glide Channel", IBM Technical Disclosure Bulletin, Jun. 1995, 95A 61224/SA8930195, vol. 38, Pub. No. 6, pp. 479-480.

* cited by examiner

*Primary Examiner*—Thomas P. Noland
(74) *Attorney, Agent, or Firm*—Bracewell & Giuliani LLP

(57) ABSTRACT

A glide head calibration technique uses two fly height calibrations on a disk media certifier. The first calibration point uses a spin down on bump technique at a first height, and the second calibration point uses a spin down on disk media roughness at a second lower height. With two height data points, a fly height curve of each glide head is approximated very accurately. Once the fly height curve is derived for each head, any fly height can be dialed-in by the disk media certifier for glide testing. This technique achieves glide fly heights between about 4 nm and 8 nm and does so with improved tolerances.

8 Claims, 3 Drawing Sheets

SYSTEM, METHOD, AND APPARATUS FOR GLIDE HEAD CALIBRATION WITH ENHANCED PZT CHANNEL FOR VERY LOW QUALIFICATION GLIDE HEIGHTS

BACKGROUND OF THE INVENTION

1. Technical Field

The present invention relates in general to improved calibration of glide heads and, in particular, to an improved system, method, and apparatus for measuring media roughness and combining that with spin down calibration to form a new and improved glide head calibration for media glide testing.

2. Description of the Related Art

Data access and storage systems comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The HDD also has an actuator assembly with an actuator that moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions or air bearing design on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

The presence of asperities on the surfaces of the disks can have a deleterious effect on the performance of disk drives. For this reason, a glide test is performed on finished disks to detect asperities that might contact the magnetic head flying at its normal height in a disk drive. In the test, a special glide head containing a piezoelectric transducer (PZT) is flown over a disk at an altitude or height that is below the normal drive fly height. Glide head contact with an asperity creates a PZT voltage response that generally scales with increasing size of the asperity. If the voltage response exceeds a predetermined level, the disk is rejected. As such, quantitative glide testing requires calibration of the voltage response with respect to asperity height.

In the prior art, there are a number of methods for calibrating glide head fly heights. One method of calibrating glide heads uses a laser-generated, nano-sized protrusion or bump on the surface of a disk that can serve as a calibration asperity. Laser nano-bump generation is a technique that is used throughout the data storage industry. Flying a glide head over a laser nano-bump whose height is known (e.g., by interference or atomic force microscopy) will thus generate a calibrated PZT response. However, when using a single laser calibration bump, statistical variation in the PZT signal from one run to another results in a wide response distribution.

In another method, the glide head is spun down onto bumps with a known average height arrayed around one or more tracks on a disk media. When the glide head touches the top of the bumps, that linear velocity is used to set the glide test at the average height of the bumps. This "spin down to bump" calibration methodology can only support bump heights down to about 8 nm. The laser melt process used to generate the bump disk media has difficulties maintaining bump height accuracies below 8 nm. However, present and future performance requirements need glide head fly heights down to about 4 nm.

One solution to this problem is to spin down onto the disk media with a substrate roughness that is very near the desired low fly height. Fortunately, most glass substrate roughness is in the range of about 3 to 4 nm. Substrate texturing techniques can generate spin down response up to about 7 nm. However, this solution alone has some deficiencies. A good glide head calibration technique should do more than just (a) set the right fly height for glide testing. The technique should also check each glide head for (b) proper flying characteristics and (c) uniform PZT response. Thus, since parameters (b) and (c) are not provided, the glide head PZT signal generated by spinning down onto the media roughness does not hold enough information to satisfy the requirements of a good calibration technique.

A second problem with spinning down onto disk media roughness is that the current glide PZT channel has problems handling the PZT response of the glide head flying at the media roughness height. Typical glide channels were designed to analyze glide heads hitting discreet media defects producing PZT signals with very fast rise and decay times. These transitions in the PZT signal trigger software interrupts allowing each discreet hit to be counted. The PZT signal of a glide head on media roughness can resemble a DC phenomena shift from low to high and stay high due to the many contacts around the track. When this happens, one cannot determine if the glide head is hitting one discreet defect or many contacts due to the media roughness.

The PZT RMS signal could be used to measure the disk media roughness with spin down. However, one significant weakness of RMS is that a single defect with sufficient amplitude can greatly affect the RMS reading of the entire track and thereby render useless any information gleaned therefrom. Thus, an improved system, method, and apparatus for glide head calibration at lower fly heights would be desirable.

SUMMARY OF THE INVENTION

One embodiment of the present invention provides a new glide head calibration as a two-point fly height calibration on a disk media certifier. The first calibration point is a spin down on bump technique at a relatively high height (e.g., 8 to 10 nm). The second calibration point is an improved spin down on disk media roughness at a relatively low height (e.g., 3 to 4 nm). With two height data points, a fly height curve (i.e., linear velocity vs. height) of each head can be approximated very accurately. Depending on the design of the glide head, a linear or power regression curve can be used. Once this fly height curve is derived for each head, any fly height can be dialed-in by the disk media certifier for glide testing.

This new technique achieves glide fly heights below 8 nm and does so with improved tolerances. A significant advantage of this technique is that a fly height curve of each glide head can be generated directly on a disk media certifier. Another option is to rely on fly height curve data from an optical fly height certifier and transfer the data to the disk media certifier. This option has many correlation issues and can contribute to glide fly height tolerance errors up to about +/−2 nm. Another advantage is that the calibration is common across media products with the same form factor but different fly height requirements. Using the same high and low height calibration disks, products can be calibrated that require any glide head fly height between about 4 and 8 nm. In addition, the first calibration at some higher fly height retains all of the benefits of checking the glide head for proper flying characteristics and uniform PZT response.

One advantage of using glide PZT peak detection over PZT RMS for the media roughness measurement is improved accuracy. A defect on the track can cause the RMS signal to prematurely trigger media roughness contact. In the case of using the PZT peak detection, one defect on the track gets averaged out if the media roughness contact point is defined as contact with some large percentage of the entire track.

In one embodiment, the first calibration point at some high fly height is determined by a glide head that is calibrated in situ on a disk glide tester that is subsequently used for disk testing. One embodiment is to use a disk that has fabricated bumps with calibrated heights. A verification is first made to insure that observed contacts are between the glide head and the bumps. Then the flying height of the glide head is then raised above the bumps and then gradually reduced by decreasing the speed between the glide head and the disk until contact occurs. In this manner, the differences in flying height from mounting on different testers is solved by calibrating the glide head on the tester that is to be used in manufacturing for testing disks. In addition, the surface topography is dominated by lubricant and sputtered carbon for both the disk with bumps and the disks to be tested. Accordingly, there is no significant difference in flying heights generated by different surface topographies.

In another embodiment, the glide head is dynamically scanned over the calibrated bumps. Dynamic scanning is accomplished by moving the glide head radially over the disk at the approximate radial location of the calibrated bump. This insures that the roll of the glide head is taken into account during the fly height calibration and that the lowest portion of the glide head is the portion that is in contact with the bump.

The second or low fly height calibration point is a new "spin down" technique requiring a new glide PZT channel and calibration algorithm. Like the first calibration point, this technique involves spin down on media roughness peaks with known average height and using peak detection. The touch down point is defined as the first linear velocity where there is contact with some significant percentage of the track sectors. Due to the nature of the PZT response of many contacts with media roughness peaks, the first calibration point technique does not work here without enhancements to the glide PZT channel.

The channel enhancements needed for this new calibration technique include a new clock circuit and multiplexing capabilities. The new clock circuit allows the glide PZT peak detection to count the many glide head contacts with the media roughness. The clock circuit effectively adds artificial signal transitions when the media roughness multiple contacts cause the PZT signal to go into the DC shift phenomenon. Essentially, this forces the channel to trigger a software interrupt at the start of each sector and count if the PZT signal is still high. The multiplexer allows the PZT signal from the glide head to travel through the glide channel in either path, depending on the desired mode. It can operate in discreet defect detection mode or in media roughness measurement mode. Software can multiplex the channel to the discreet defect detection mode for the high fly height calibration, multiplex to media roughness measurement mode for the low fly height calibration, and then multiplex back to defect detection for glide testing.

After both calibration points are successful for any glide head, a fly height curve can be generated with either a linear or a power function curve fit. This curve is then used to set up the proper linear velocity for each glide head's required glide fly height.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others that will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
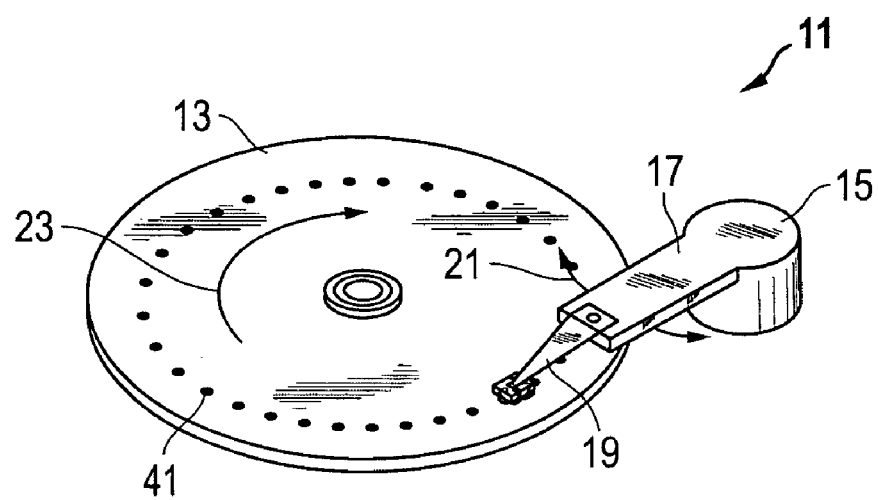
FIG. 1 is a schematic isometric drawing of one embodiment of a calibration system constructed in accordance with the present invention.

Referring to FIG. 1, one embodiment of an apparatus 11 for calibrating a glide head utilizes a rotating, magnetic disk 13 having a large plurality of tracks. The disk 13 also has a plurality of precisely formed glide bumps 41 that are used during the calibration process, as will be described below. Apparatus 11 comprises an actuator 15 with a movable arm 17 and a suspension 19 on one end. Arm 17 and disk 13 move in the directions indicated by arrows 21, 23, respectively. Arm 17 provides the seek motion when changing tracks on disk 13.

Figure 2:
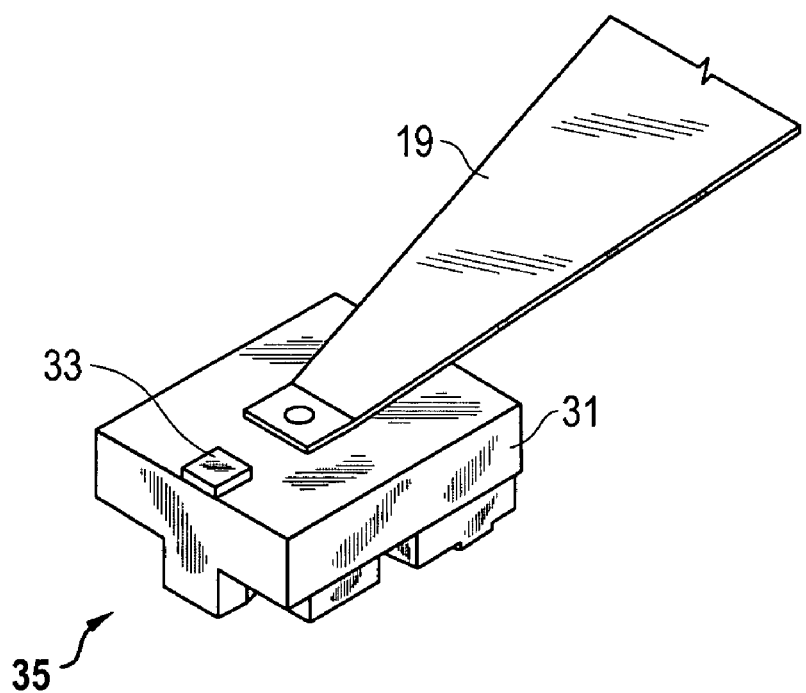
FIG. 2 is a partial isometric view of a head gimbal assembly utilized by the system of FIG. 1.

As shown in FIG. 2, a slider or flying/glide head 31 is bonded to the end of suspension 19. In the embodiment shown, glide head 31 is nano size (approximately 2050× 1600×450 microns) and formed from ceramic or intermetallic materials. Glide head 31 may also be pico size (approximately 1250×1000×300 microns). Glide head 31 is pre-loaded against the surface of disk 13 (typically in the range two to ten grams) by suspension 19. It is glide head 31 that is calibrated with respect to the surface of disk 13.

Glide head 31 carries a piezoelectric element 33 (shown schematically) on its upper surface adjacent to suspension 19. The contacting side or air bearing 35 of head 31 which touches disk 13 is located opposite element 33. Element 33 produces an electrical voltage (PZT) signal when head 31 is mechanically excited, such as when air bearing 35 touches a protruding asperity on the surface of disk 13. The stronger the contact between head 31 and the asperity, the higher the signal produced. Thus, with proper calibration, head 31 can be used to determine the size of the disk defects.

Figure 3:
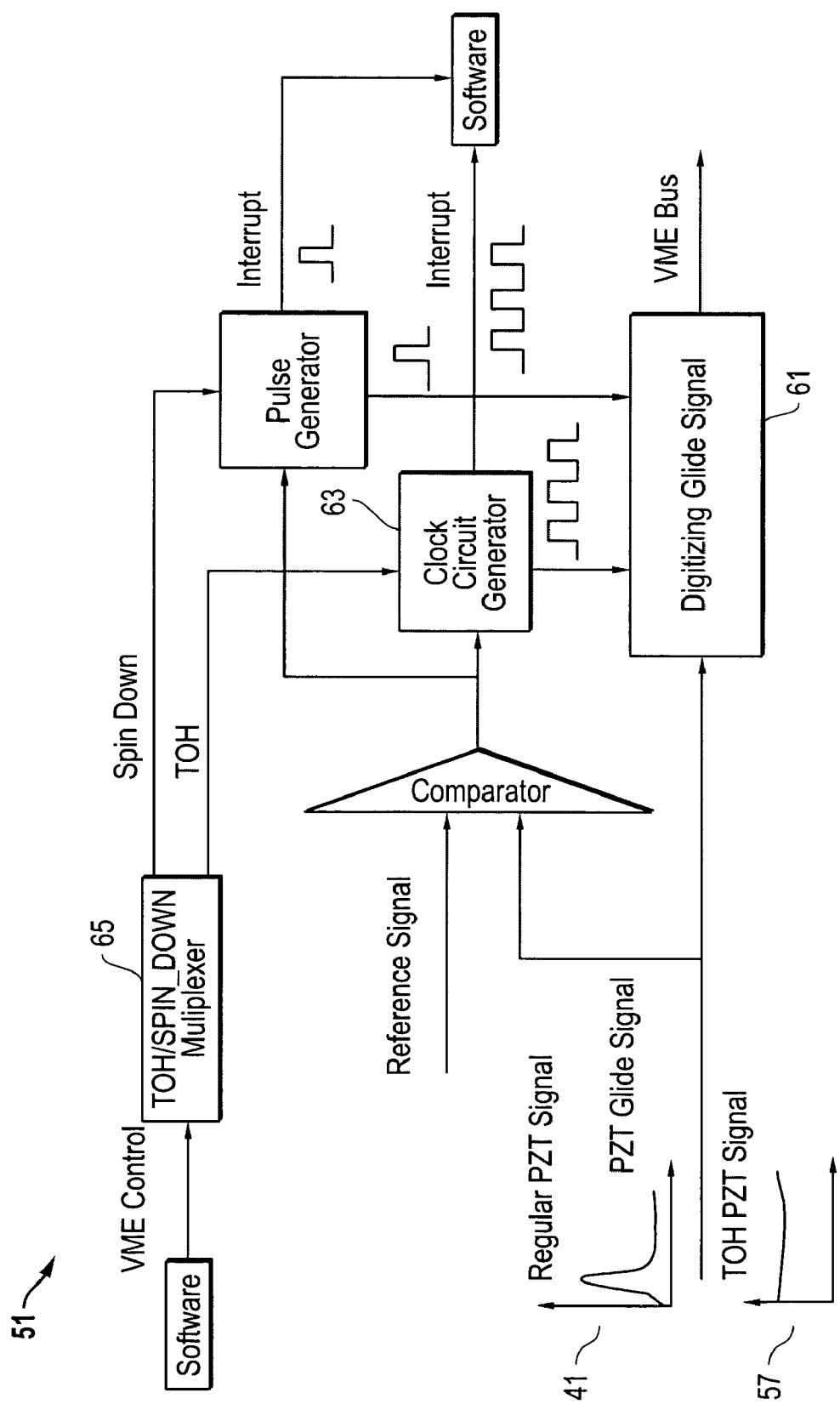
FIG. 3 is circuit block diagram constructed in accordance with the present invention.
Figure 4:
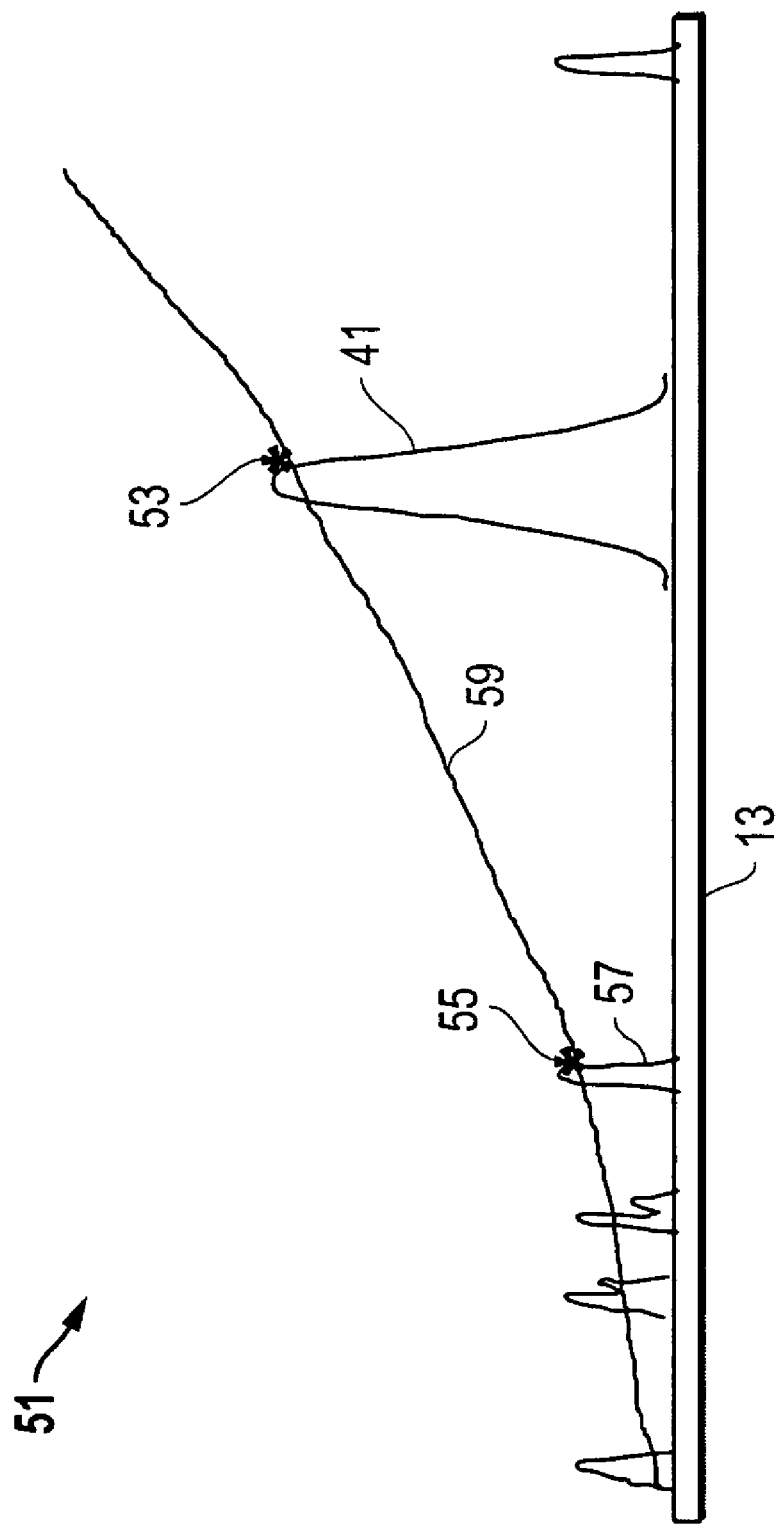
FIG. 4 is a plot of a glide head fly height showing, on the x-axis, linear velocity and, on the y-axis, fly height from a surface of the disk, and illustrating a glide head calibration methodology of the present invention.

Referring now to FIGS. 3 and 4, one embodiment of a system 51 for glide head calibration with a two-point fly height calibration on a disk media certifier is shown. The system 51 comprises a first calibration point 53 derived from a spin down on bump technique at a relatively high height based on fabricated bumps 41 with calibrated heights on the disk 13. A second calibration point 55 derived from a spin down on disk media roughness 57 technique at a relatively low height. A fly height curve 59 of linear velocity vs. fly height of a glide head 35 is approximated with the first and second calibration points 53, 55.

For example, the relatively high height (of bump 41) is approximately 8 to 10 nm, and the relatively low height (of roughness 57) is approximately 3 to 4 nm. A number of methods may be used to derive fly height curve 59, including a linear regression curve and a power regression curve. The best fit will depend on the geometries of the glide head air bearing slider design. The fly height curve 59 is used to set up a linear velocity for a required glide fly height for the glide head 35 such that any fly height can be dialed-in for the glide head 35 by the disk media certifier for glide testing. A less accurate method would be data for the fly height curve 59 as determined by an optical fly height certifier, in which case the data is transferred to the disk media certifier. The new method is an improvement and replacement for the latter.

In a general sense, the first calibration point 53 may be derived by making contact between the glide head 35 and the bumps 41 on the disk 13, raising the flying height of the glide head 35 above the bumps 41, and then gradually reducing the fly height by decreasing the speed between the glide head 35 and the disk 13 until contact occurs again.

More particularly, the first calibration point 53 may be determined by: flying the glide head 35 over the rotating disk 13, verifying that observed contacts are between the glide head 35 and the bump 41, reducing the speed between the glide head 35 and the disk 13 by a discrete interval, dynamically scanning the disk 13 at each discrete interval of speed, and calibrating the flying height of the glide head 35 when a value of the spin down speed has been successfully determined. After verification, the initial flying height of the glide head 35 is higher than the calibrated bump 41, which may number from two to forty equally-spaced apart, calibrated bumps 41 on the disk 13.

The second calibration point 55 is a touch down point on the disk 13 by the glide head 35 and is defined as the first linear velocity where there is contact with a significant percentage of the track sectors. The second calibration point 55 may utilize a calibration algorithm, a glide PZT channel 61, a clock circuit 63, and multiplexing capabilities 65. The glide PZT channel 61 alone cannot handle typical touch down signals (media roughness) because there is only one signal low to high transition. This generates only a single interrupt and only one count for a track of potentially many touch down contacts. By definition, we are looking for some percentage of sectors in a track with counts to define the first linear velocity.

The clock circuit 63, which can be controlled by software, is added so that when enabled will generate interrupts at the start of each sector as long as the touch down signal stays higher than the clip level of the single interrupt. The clock circuit 63 also continues to digitize the glide signal as long as the interrupts are generated. This allows the proper counting of sectors with contacts in the determination of the first linear velocity for the second calibration point 55. The multiplexing capabilities 65 allow the same glide channel to function for both the first calibration point 53 which does not need the clock circuit 63 and the second calibration point 55 which does need the clock circuit 63.

The present invention also comprises a method of glide head calibration with a two-point fly height calibration on a disk media certifier. One embodiment of the method comprises deriving a first calibration point from a spin down on bump technique at a relatively high height, such as flying the glide head at 8 to 10 nm; deriving a second calibration point from a spin down on disk media roughness technique at a relatively low height, such as flying the glide head at 3 to 4 nm; and approximating a fly height curve of linear velocity vs. fly height of a glide head with the first and second calibration points. The final step may comprise using one of a linear regression curve and a power regression curve to determine the fly height curve.

The method may further comprise using the fly height curve to set up a linear velocity for a required glide fly height for the glide head such that any fly height can be dialed-in for the glide head by the disk media certifier for glide testing. In one alternate embodiment, derivation of the second calibration point may comprise using a glide PZT channel, a calibration algorithm, a clock circuit, and multiplexing capabilities, wherein a touch down point is defined as a first linear velocity where there is contact with a significant percentage of the track sectors. In one version, the multiplexer allows the PZT signal from the glide head to function for both the first calibration point, which does not need the clock circuit, and the second calibration point which does need the clock circuit, depending on a desired mode.

The method may further comprise generating interrupts with the clock circuit at a start of each sector as long as a touch down signal stays higher than a clip level of a single interrupt, and digitizing the glide signal with the clock circuit as long as the interrupts are generated, and counting sectors with contacts in determining the first linear velocity for the second calibration point. In addition, the method may comprise deriving the first calibration point by contact made between the glide head and the bumps on the disk, raising the flying height of the glide head above the bumps, and then gradually reducing the flying height by decreasing the speed between the glide head and the disk until contact occurs again.

While the invention has been shown or described in only some of its forms, it should be apparent to those skilled in the art that it is not so limited, but is susceptible to various changes without departing from the scope of the invention.

What is claimed is:

1. A method of glide head calibration with a two-point fly height calibration on a disk media certifier, comprising:
   (a) deriving a first calibration point from a spin down on bump technique at a relatively high height;
   (b) deriving a second calibration point from a spin down on disk media roughness technique at a relatively low height; and
   (c) approximating a fly height curve of linear velocity vs. fly height of a glide head with the first and second calibration points.

2. The method of claim 1, wherein step (a) comprises flying the glide head at 8 to 10 nm, and step (b) comprises flying the glide head at 3 to 4 nm.

3. The method of claim 1, wherein step (c) comprises using one of a linear regression curve and a power regression curve to determine the fly height curve.

4. The method of claim 1, further comprising using the fly height curve to set up a linear velocity for a required glide fly height for the glide head such that any fly height can be dialed-in for the glide head by the disk media certifier for glide testing.

5. The method of claim 1, wherein step (b) comprises using a glide PZT channel, a calibration algorithm, a clock circuit, and multiplexing capabilities, wherein a touch down point is defined as a first linear velocity where there is contact with a significant percentage of the track sectors.

6. The method of claim 5, further comprising generating interrupts with the clock circuit at a start of each sector as long as a touch down signal stays higher than a clip level of a single interrupt, and digitizing the glide signal with the clock circuit as long as the interrupts are generated, and counting sectors with contacts in determining the first linear velocity for the second calibration point.

7. The method of claim 5, wherein a multiplexer allows the PZT signal from the glide head to function for both the first calibration point, which does not need the clock circuit, and the second calibration point which does need the clock circuit, depending on a desired mode.

8. The method of claim 1, wherein step (a) comprises deriving the first calibration point by contact made between the glide head and the bumps on the disk, raising the flying height of the glide head above the bumps, and then gradually reducing the flying height by decreasing the speed between the glide head and the disk until contact occurs again.

* * * * *